Dec. 28, 1954  J. E. WARNER  2,698,052
VEHICLE WINDOW COVER
Filed Oct. 31, 1950  2 Sheets-Sheet 1
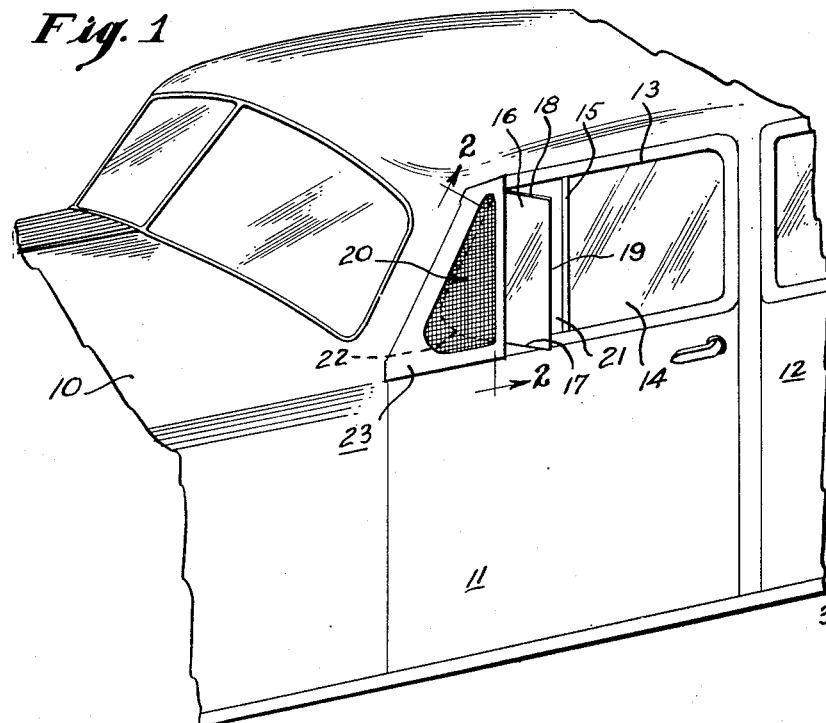
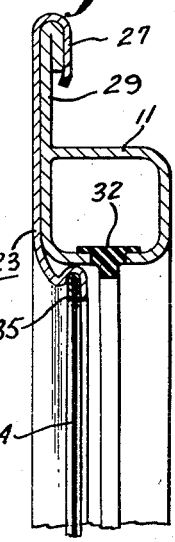
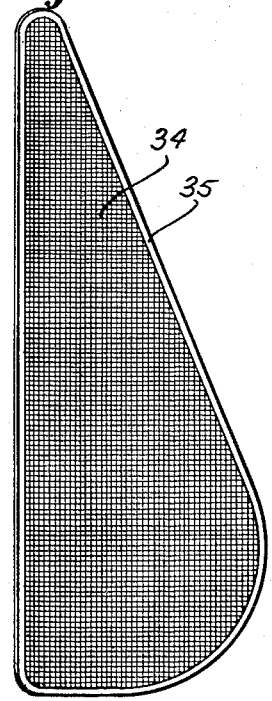
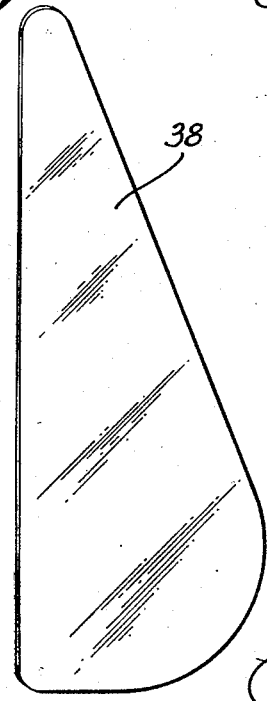
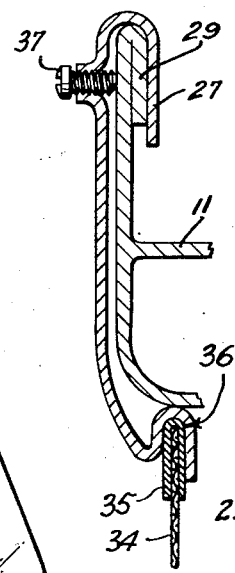
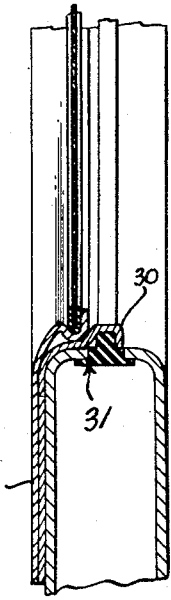
INVENTOR
By John E. Warner
Leonard L. Kalish
ATTORNEY

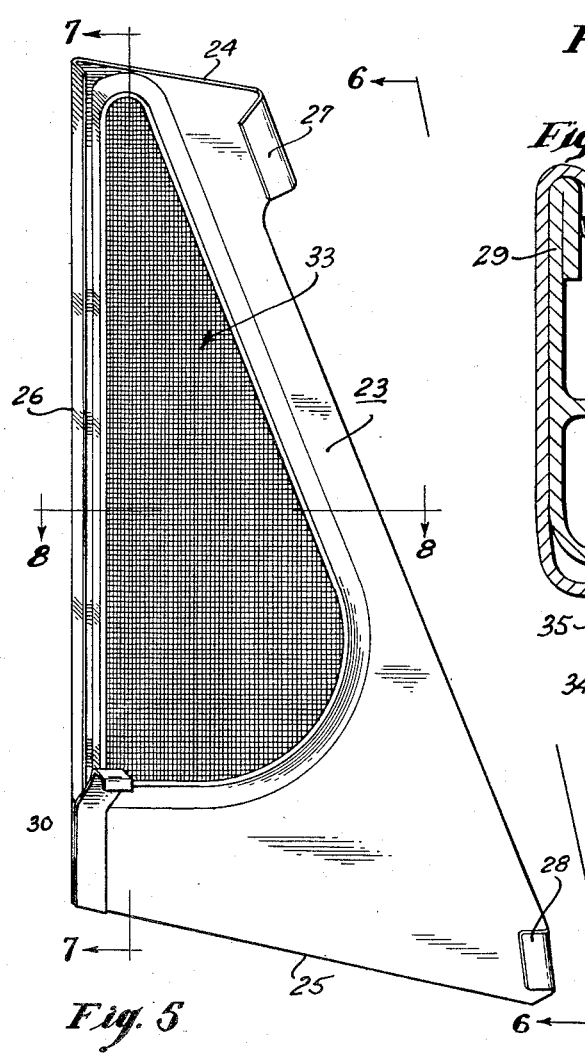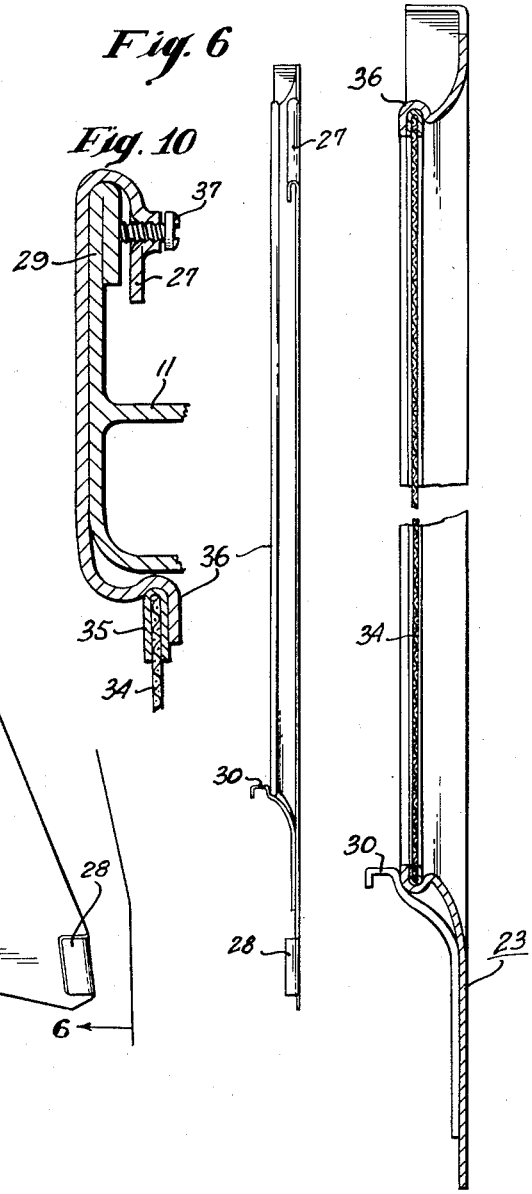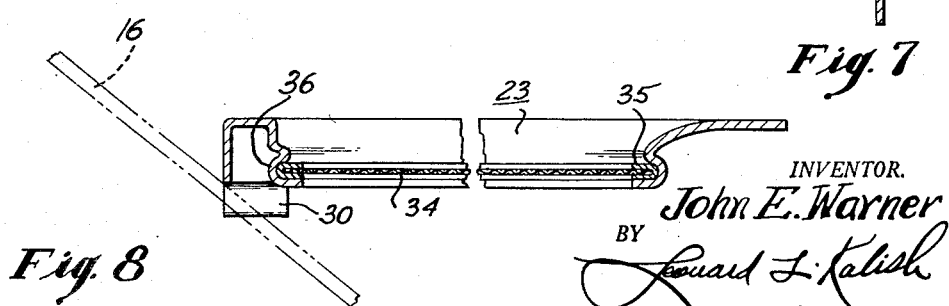

United States Patent Office 2,698,052
Patented Dec. 28, 1954

2,698,052

VEHICLE WINDOW COVER

John E. Warner, Bristol, Pa.

Application October 31, 1950, Serial No. 193,142

3 Claims. (Cl. 160—93)

The present invention relates to window-screens and particularly to window-screens adapted for use on automobiles or similar vehicles. The present invention relates still more particularly to screens adapted for use in conjunction with the small pivotable ventilator-windowpanes in present-day automobiles.

An object of the present invention is to provide a window-screen which is adapted to fit across the opening in front of a pivotable ventilator-windowpane in modern automobiles.

Another object of the present invention is to provide an automobile window-screen which need not be removed when the pivotable ventilator-windowpane is swung open.

Still another object of the present invention is to provide a support which is adapted to be secured adjacent an automobile window; said support providing means for holding a screen and/or an auxiliary windowpane in place thereon.

Further objects will be apparent by reference to the appended specification, claims and drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the accompanying drawings wherein like reference characters indicate like parts, Figure 1 represents a fragmentary perspective view of an automobile body, and particularly the left-front portion thereof, showing the window-screen of the present invention in place adjacent the window in the door next to the driver's seat.

Figure 2 represents a cross-sectional view taken along lines 2—2 of Figure 1.

Figure 3 represents a perspective view of the removable wire-mesh insert of the window-screen of the present invention.

Figure 4 represents a perspective view of the removable auxiliary windowpane of the present invention.

Figure 5 represents a perspective view, shown generally from the inside and rear of the supporting frame and the screen of the present invention.

Figure 6 represents an end-elevational view, taken generally along lines 6—6 of Figure 5.

Figure 7 represents a vertical cross-sectional view taken generally along lines 7—7 of Figure 5, but on a larger scale.

Figure 8 represents a horizontal cross-sectional view taken generally along lines 8—8 of Figure 5, but on a larger scale.

Figure 9 represents a fragmentary cross-sectional view of modified means for holding the supporting frame of the present invention in position on the framework of an automobile door.

Figure 10 represents a fragmentary cross-sectional view similar to Figure 9, showing still another modified form of frame-supporting means.

In present-day automobiles, some of the windows, particularly the windows in the right-front and left-front doors, are provided with small, pivotable ventilator-windowpanes in addition to the generally standard vertically-slidable windowpanes which are adapted to close off the major portion of the openings in the doors. These ventilator-windowpanes are pivotable about a generally vertical axis whereby the forward edge moves inwardly and the rear or trailing edge moves outwardly about the same pivot. This type of ventilator-windowpane provides an adjustable, inclined surface disposed at an angle to the body of the automobile, a part thereof extending outwardly from the body, whereby the movement of the outside air past the inclined surface of the ventilator-windowpane, as the automobile moves forwardly (and more particularly as the automobile moves forwardly at increased speeds) causes a suction-induced or vacuum-induced air-flow through the automobile.

There is illustrated in Figure 1 an automobile body 10 having a plurality of doors 11 and 12 therein. The left-front door 11 has a window 13 with a vertically-slidable windowpane 14 operable to close off the major portion thereof. In some cases, a vertical separator-strip 15 provides additional support for the windowpane 14 when it is in elevated position across the opening 13, although this strengthening member or separator member 15 may, optionally, be eliminated.

A ventilator-windowpane 16 is disposed across the forward portion of the window 13 and may be supported at a point along its lower edge 17 and its upper edge 18, intermediate the rear or trailing edge 19 and the forward or leading edge 20. These ventilator-windowpanes are adapted to pivot about the upper and lower supports so that the forward edge 20 moves into the car and the trailing edge 19 moves outwardly or away from the body of the car, as shown in Figure 1. As the automobile moves forwardly, the flow of air past the outwardly-inclined rear portion of the ventilator-windowpane 16 creates a vacuum which causes the air within the automobile to be drawn outwardly through the opening 21, while fresh air is drawn inwardly through the opening 22.

I have found, however, that when this type of ventilating system is used in the summer time, insects or other air-borne matter may be drawn into the automobile through the opening 22, particularly when the automobile is traveling at a high rate of speed. When insects such as wasps or bees or the like are thus drawn into a closed compartment like the body of an automobile, they cause great consternation and extreme hazard to the occupants because they distract the driver of the automobile and draw his attention from the task of operating the vehicle.

To prevent the entry of air-borne matter into the automobile through the opening 22, I provide the screen of the present invention across said opening. A frame 23 is adapted to be clamped to the automobile body (particularly to the edge of the door 11) across the opening 22, ahead of the pivot-portion of the ventilator-windowpane 16. The trailing edge of the frame 23 may be resilient and may contact the window 16 along the pivot-line so that, in all positions of the windowpane 16 (as shown particularly in Figures 1 and 8), the trailing edge of the frame will be in contact with the windowpane 16 and extend completely across the opening 22. This arrangement permits the window 16 to be opened and closed without removing the frame 23 from the door of the automobile.

The frame 23 is generally trapezoidal-shaped and of sufficient size to extend across the opening 22 with the upper edge 24 above the opening 22 and with the lower edge 25 beneath the opening 22 and with the trailing edge 26 in contact with the windowpane 16 along its pivot-line. An upper front bracket 27 and a lower front bracket 28 are in-turned from the frame 23 and bent rearwardly to form a pair of fingers which extend around the flange 29 at the forward edge of the door 11. In addition, a vertical support-bracket 30 is adapted to extend inwardly from the frame 23 into the window-channel 31 (or across the beaded gasket 32 which, in most cars, fills the channel 31 to form a sealing means between the windowpane 16 and the door 11).

A screen 34 is adapted to fit across the opening 33 in the frame 23. The screen 34 may have a reinforced edge 35 which can be inserted into the groove 36 around the opening 33. The portion of the frame 23 which defines the opening 33 may be a somewhat resilient in-turned flange having the groove 36 therein in which the screen 34, and particularly the reinforcing edge 35, may be supported.

The frame 23, with the screen 34 in place across the opening 33, may be fastened across the opening 22 in the window, with the brackets or fingers 27 and 28 secured around the flange 29 of the door 11. The bracket 30 supports the screen vertically and also hold the rear or trailing edge 26 of the frame 23 against the window 16. The brackets 27, 28 and 30 may be formed of spring-material so they snap into place and are secured by a snap-action. However, as is shown in Figures 9 and 10, a set-screw 37 may be used on the flanges 27 and 28, or on the frame 23 adjacent the flanges 27 and 28, to provide a positive locking-action between the flanges and the frame.

With the screen of the present invention in position across the opening 22, the windowpane 16 may be pivoted to an open position or to a closed position and, in the opened position, shown in Figure 1, the ventilator may function properly by drawing air into the car through the opening 22 and through the screen 34, while permitting the air within the automobile to be drawn outwardly through the opening 21.

The screen of the present invention may be made in various sizes and shapes to fit upon the window-opening 22 of various styles and makes of automobiles.

As is shown in Figure 4, an auxiliary windowpane 38, having the same external dimensions and of the same shape and generally of the same thickness as the reinforcing edge 35 of the screen 34, may, selectively, replace the screen 34 within the groove 36. Because the spring action of the material forming the peripheral groove 36 permits the removal of the screen 34, the auxiliary windowpane 38 may be inserted across the opening 33 in place of the screen 34. Thus, in inclement weather, the screen 34 may be replaced by the window 38 within the peripheral groove 36. Thereafter, as the automobile moves forwardly, the flow of air past the trailing edge 19 of the inclined windowpane 16 will exhaust the air from the automobile through the opening 21 but the auxiliary windowpane 38 will prevent the entry of moisture-carrying air into the automobile through the opening 22.

Thus, the present invention provides a window-screen for use across the window-opening of an automobile in conjunction with a pivotable ventilator-windowpane without impeding the effective and efficient operation of said ventilator-windowpane.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention, what I claim as new and desire to protect by Letters Patent is the following:

1. A ventilator shield for use with an automobile door having a ventilator window-pane pivotally mounted about a substantially vertical axis, said shield including a frame, having an inclined forward edge, a more or less horizontal bottom edge and a generally upright rear edge, a hook formed integrally with the front edge of said frame adapted to embrace the thin front marginal frame of the door, a hook on the lower edge of said frame adapted to engage the window sill of the door in the zone of the ventilator thereof, said rear edge being in contact with the ventilator window pane when said hooks are in operative contact with the door and a screen having a shape resembling that portion of the window pane anterior of the window-pane's pivot point, resiliently and detachably supported in said frame.

2. A ventilator shield for use with an automobile door having a ventilator window-pane pivotally mounted about a substantially vertical axis, said shield including a frame, having an inclined forward edge, a more or less horizontal bottom edge and a generally upright rear edge, a hook formed integrally with the front edge of said frame adapted to embrace the thin front marginal frame of the door, a hook on the lower edge of said frame adapted to engage the window sill of the door in the zone of the ventilator thereof, a slightly undercut groove along the inner periphery of said frame, the inner periphery of said frame having a shape resembling that portion of the window pane anterior of the window-pane's pivot point, said groove adapted resiliently and detachably to receive and engage and retain a shielding panel therewithin, and a shielding panel detachably retained in the frame by said groove.

3. An apparatus for shielding a ventilator window and for use with an automobile door having a window-pane mounted to pivot about a substantially vertical axis, said apparatus including a frame defining an opening having a shape resembling that portion of the window pane anterior of the window-pane's pivot point, a hook formed integrally with the front edge of said frame adapted to embrace the thin front marginal frame of the door, a hook on the lower edge of said frame adapted to engage the window sill of the door, means on said hooks for detachably mounting the frame to the door with the rear edge of said frame adjacent the outside of the window-pane near said axis, resilient metal portions in the frame defining a yieldingly enlargeable and slightly undercut groove about substantially all of the periphery of the opening in the frame for securing selectively only one cover, an imperforate transparent cover having a stiff edge engageable in said yieldingly enlargeable groove for detachably and selectively securing the cover over the opening, and a screen-type cover having a stiff edge engageable in said yieldingly enlargeable groove for detachably and selectively securing the screen-type cover over the opening.

References Cited in the file of this patent

UNITED STATES PATENTS

| Number | Name | Date |
|---|---|---|
| 1,681,300 | Maas | Aug. 21, 1928 |
| 1,756,227 | Torrent | Apr. 29, 1930 |
| 2,019,127 | Flynn et al. | Oct. 29, 1935 |
| 2,504,204 | Kiefer | Apr. 18, 1950 |
| 2,528,786 | Roberts | Nov. 7, 1950 |